Oct. 28, 1969   H. SPODIG   3,474,892
CONVEYOR ARRANGEMENT FOR MAGNETIZABLE OBJECTS
Filed March 16, 1967   3 Sheets-Sheet 2

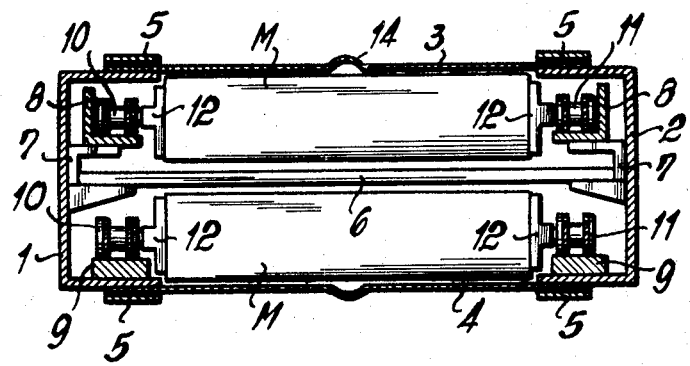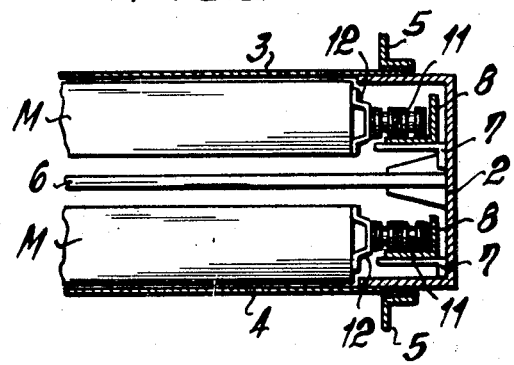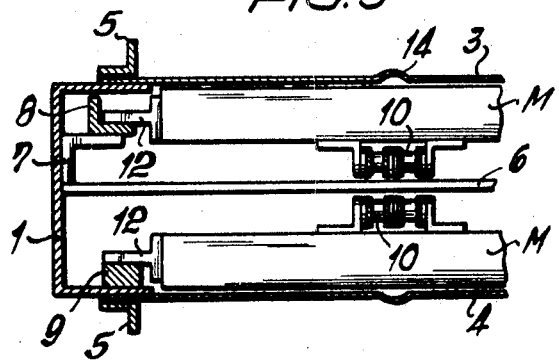

INVENTOR
Heinrich Spodig
by Michael J. Striker

Oct. 28, 1969       H. SPODIG       3,474,892
CONVEYOR ARRANGEMENT FOR MAGNETIZABLE OBJECTS
Filed March 16, 1967                3 Sheets-Sheet 3
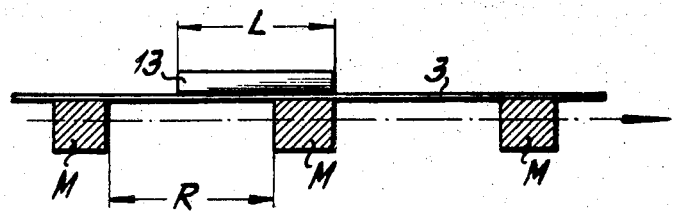
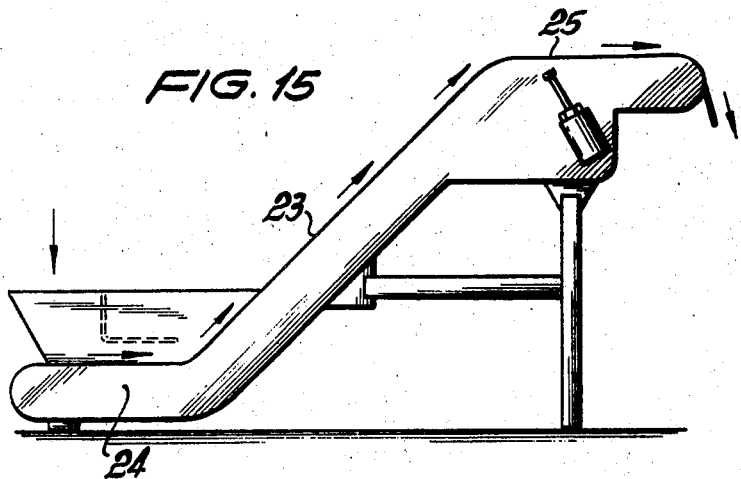
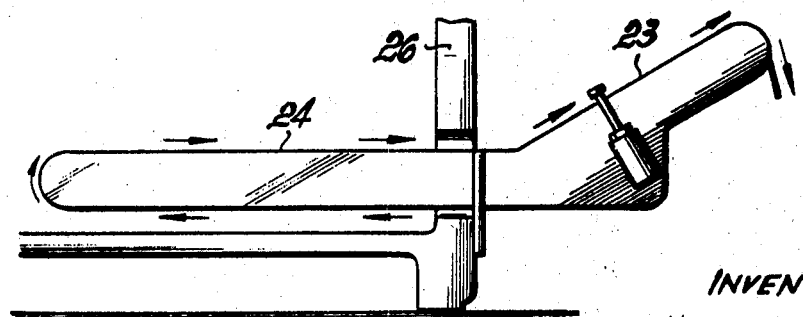
INVENTOR
Heinrich Spodig United States Patent Office 3,474,892
Patented Oct. 28, 1969

3,474,892
CONVEYOR ARRANGEMENT FOR MAGNETIZABLE OBJECTS
Heinrich Spodig, 84 Netteberge, 4711 Bork, Germany
Filed Mar. 16, 1967, Ser. No. 623,592
Int. Cl. B65g 47/46
U.S. Cl. 198—41         17 Claims

ABSTRACT OF THE DISCLOSURE

An arrangement for conveying magnetizable objects. Permanent magnets are mounted in a closely spaced manner on a conveyor system. The conveyor system is driven so that the permanent magnets move along a predetermined path. The entire conveying system is sealed within an enclosure. The objects to be conveyed are in contact with a supporting surface or side of the enclosure. As the permanent magnets move within the enclosure, the objects, having magnetizable characteristics, slide along the external surface of the enclosure and are thereby conveyed to the desired destination.

BACKGROUND OF THE INVENTION

Magnetic conveying systems, as commonly known in the art, exhibit a number of inherent disadvantages when conveying magnetizable materials or objects. When conveying objects or products immersed in cooling fluid containing chips or filings, for example, the conveyor system tends to be clogged by such filings and thereby provide poor transportation characteristics. Furthermore, the conveying system as commonly known, sags towards the center of the conveying path and thereby cause a non-uniform magnetic field to prevail along the magnetic conveying path. This feature gives rise to the condition that pile-ups at certain locations of the path are generated, resulting in an irregular movement of the material to be conveyed along the path. Thus, in such designs, heretofore, materials would pile up at locations corresponding to stronger magnetic fields, and then be suddenly severed from these pile-up locations to be further conveyed along the predetermined path. These problems arise particularly in association with magnetic conveyor systems that are in use for the purpose of transporting freshly machined parts. Such parts will generally be covered considerably with cooling fluids and chips or filings resulting from the machining. The present invention solves the preceding problem by providing a conveyor system that is completely enclosed and produces a uniform magnetic field. The invention furthermore provides for draining off any accumulation of cooling fluids and chips or filings immersed therein.

SUMMARY OF THE INVENTION

A conveyor arrangement for conveying magnetizable objects along a predetermined path comprising, in combination, an elongated carrier having an elongated carrier face extending in direction of said predetermined path for slidably supporting the objects to be conveyed in longitudinal direction of said elongated carrier;

a plurality of permanent magnets disposed adjacent to said elongated carrier face of said elongated carrier spaced from each other and movable in longitudinal direction of said elongated carrier; and driving means for moving said permanent magnets spaced from each other adjacent to and along said carrier face of said elongated carrier so as to provide a magnetic field acting upon said magnetizable objects for sliding the latter on said carrier face of said elongated carrier while said permanent magnets are moved by said driving means adjacent to and along said elongated carrier face of said elongated carrier.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a transverse cross-sectional view of the conveyor system, and shows the manner in which the permanent magnets are supported and conveyed within the enclosure of the system;

FIG. 2 is a partial cross-sectional transverse view showing an alternate embodiment for the chain drive which moves the permanent magnets;

FIG. 3 is a partial transverse cross-sectional view of an embodiment in which a single chain drive is employed for the purpose of driving the permanent magnets within the enclosure of the conveyor system;

FIG. 14 is a schematic cross-sectional representation and shows the relationship between the spacing of the permanent magnets and the dimension of the objects to be conveyed; and FIGS. 15 and 16 are transverse elevational views of conveyor systems comprised of differently directed paths connected to each other in angular relationship.

DESCRIPTION OF THE PREFERRED EMBODIMENTS

Figure 4:
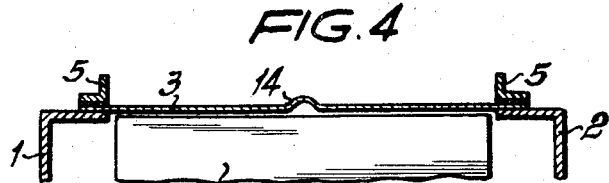
FIGS. 4 to 7 show different embodiments for the purpose of strengthening the carrier or sliding plate upon which the materials to be conveyed are moved along, as well as the construction for draining off any accumulation of cooling fluids and chips or filings immersed therein.

The conveyor, in accordance with the drawing, is of rectangular cross section and constructed of ferromagnetic side rails 1 and 2, and non-ferromagnetic slide or carrier plates 3 and 4. The slide or carrier plates 3 and 4 rest upon flanges of the side rails 1 and 2. Limiting rails 5 bearing against the slide or carrier plates 3 and 4, serve to seal the enclosure of the conveyor. Connecting struts 6 are provided at approximately the center of the flanges of the side rails 1 and 2 to aid in strengthening the enclosure. Brackets 7 spaced by the connecting strut 6, support guide ledges 8 which are of the same length as the conveyance path and are located on the inner faces of the side rails. Guide ledges 9 are supported upon the flanges of side rails 1 and 2, and are situated below the connecting struts 6. The guide ledges 8 and 9 serve as the support for a chain drive comprising endless roller chains 10 and 11. The chains ride along the side rails 1 and 2, and are retained between chain wheels (not shown) mounted at the ends of the guide ledges 8 and 9.

The conveyor includes a magnetic system formed from individual magnetic ledges M spaced in sequential relationship with respect to each other. These magnetic ledges M are secured, at each side, to the roller chains 10 and 11, through the connecting members 12 rotatably secured on tongue bolts. The magnetic ledges M thus form within the slide or carrier plates 3 and 4, webs between the roller chains 10 and 11 as well as the side rails 1 and 2. Depending on the number and weight of the magnetic ledges which are to be secured to the roller chains 10 and 11, the latter may be designed of the duplex type, as shown in FIG. 2.

For the purpose of moving the magnetic ledges or bars M, only one roller chain may be provided, if desired. In such a case, the roller chain is preferably located centrally with respect to the magnetic ledges, as shown in FIG. 3. In this configuration, the magnetic ledges M are supported through means of the connection members 12 which slide along the guide ledges 8 and 9. This particular construction is especially applicable to a small conveyor having a narrow conveying surface. The strength of the magnetic field or density of the magnetic flux on the conveyor surface, is determined by the number of magnetic ledges M secured to the roller chains 10 and 11. On the other hand, however, it is essential to space the magnetic ledges with respect to each other, as a function of the dimension of the objects to be conveyed. As indicated in FIG. 14, the space R between adjacent magnetic ledges M must exceed the dimension L of the object to be conveyed. To realize a continuously sliding process, in practice, it is desirable that the object 13 does not project further than two thirds into the space of between adjacent ledges M.

Figure 5:
Figure 6:
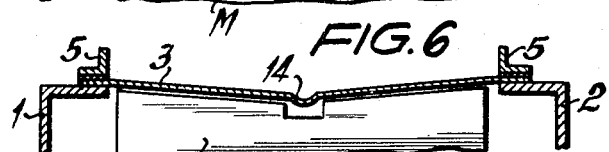
Figure 7:
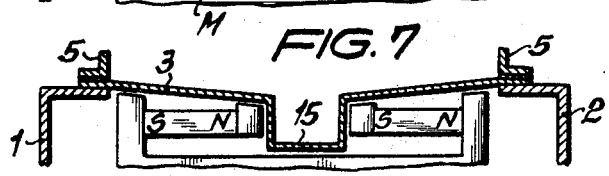

To stiffen and strengthen the slide or carrier plates 3 and 4, ridges or ribs 14 may be provided on the plates. These ridges may project from either side of the plates, as shown in FIGS. 4 and 6, and may be located equally distant from the longitudinal edges of the plates. An alternate embodiment resides in the design of FIG. 5 in which the slide or carrier plates include an angular bend so that the sides slope toward the longitudinal edges of the plates. Such angular bends may also be in the opposite direction as shown in FIGS. 6 and 7. When the angular bends correspond to the latter, they serve to drain off liquid materials that may be associated with the objects 13 conveyed along the conveyor. For example, such liquid substances may comprise masses of cooling fluid and chips or filings covering the object 13. As the latter are conveyed along, the cooling fluid, together with the chips or filings, may be drained off and leave the objects 13 in a dry condition when they arrive at their final station on the conveyor.

FIG. 7 shows an alternate embodiment of the design of the ridge for strengthening the slide or carrier plates 3 and 4. In this design, the ridge is in the form of a rectangular shape trough 15 which projects directly between the magnetic ledges M, in a manner to be described in greater detail hereinbelow. This particular construction of the ridge also permits it to serve as an expansion joint applicable when hot filings or chips prevail on the conveyor.

Figure 8:
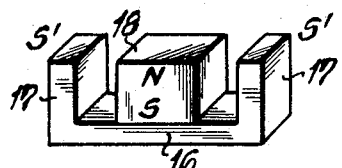
FIGS. 8 to 13 are isometric views of various possible arrangements for the permanent magnets within the enclosure of the conveyor system.
Figure 9:
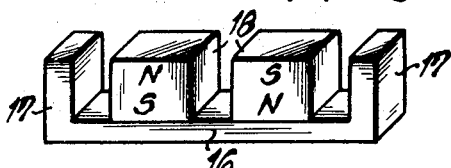
Figure 10:
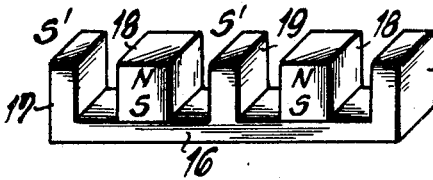
Figure 11:
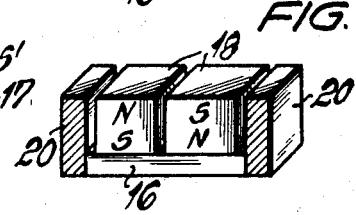

The magnetic ledges M comprise a basic U-shaped body having a ferromagnetic base 16 and side walls or legs 17. If desired, the latter may be made of non-ferromagnetic material, in which case the construction corresponds to that of FIG. 11. In FIG. 8, the base 16 supports a magnet 18 placed between the side walls or legs 17 when made of ferromagnetic material. An alternate embodiment is shown in FIG. 9 in which several magnets 18 are situated upon the base 16. In this configuration, the direction of the magnetic field is substantially parallel to the side walls of the legs 17. When at least two magnets 18 are retained on the base 16, a conductive tongue 19 may be interposed between the magnets 18, as shown in FIG. 10. The arrangement employing a conductive tongue 19 reduces the requirement for the number of magnets 18. The number of the latter depends on the length desired for the magnetic ledges. The conductive tongue acquires polarity through the base 16 and thereby forms an auxiliary pole in association with the adjacent poles 18, in a manner similar to that corresponding to the side walls 17. When the side walls 17 are made of non-ferromagnetic material, as shown in FIG. 11, magnetic flux emanating from the end faces of the magnetic ledge are substantially eliminated. This feature can be of importance if the conveyor is mounted upon the bed of a machine and a magnetic field or link is to be prevented between the machine bed and the conveyor. In such an embodiment of the magnetic ledge, the conductive tongues 19 may also be alternately situated with respect to the magnets 18.

Figure 12:
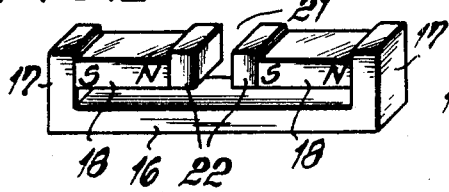

In the preceding arrangement, a magnetically scattered field is generated above the magnet or conductive poles. In contrast to the situation, an alternate embodiment may be derived by mounting the magnets 18 parallel to the base 16 as shown in FIG. 12. A magnetic block field then arises within the space 21 between the magnets 18, in FIG. 12, because the magnets 18 are oriented in the same direction. This design is particularly adaptable to the construction wherein the magnet ledge M includes a trough 15 integral with the carrier plates 3 and 4. As shown in FIG. 7, the trough 15 may, in this design extend into the space 21 and be subjected to the influence of the magnetic block field. As already indicated, small particles such as chips or fillings may collect within the trough 15 as they are washed into it through cooling liquids applied to the objects 13 moving on the conveyor. Assuming the width of the trough 15 to be somewhat smaller than the dimension L of the object 13, the design of FIG. 7 permits concentrating of the objects or merchandise to be conveyed and, at the same time, the draining of any cooling fluid that may be present. In this manner, completely unobstructed conveyance of the objects 13 is realized.

Figure 13:
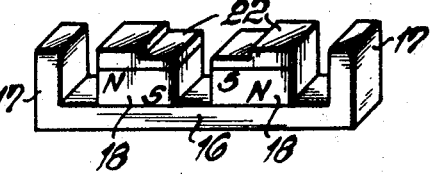

The magnets 18, as shown in FIGS. 12 and 13, may be provided with pole shoes 22. FIG. 13 illustrates an embodiment wherein the pole shoes 22 are thinner along the surfaces covering the neighboring south poles. In this manner, a variation in the amount of flux emanating from the magnets, may be obtained.

The conveyor may comprise a system of differently directed paths connected with each other. As shown in FIG. 13, for example, an inclined path 23 may operate in conjunction with a receiving path 24 and a horizontal discharge path 25.

Conveyors which are mounted within beds 26 of machines, are preferably constructed in accordance with the design of FIG. 16. In such a configuration, the conveyor comprises a horizontal reception path 24 cooperating with a slanting path 23 secured thereto. A further angularly directed conveying path may be connected to the slanting or inclined path 23, if necessary. The receiving path 24 within the machine bed 26, has magnetic characteristics on its upper and lower surfaces. In this manner, particles situated in the deeper parts of the machine bed may also be picked up and conveyed away. Adjustable chain tensioners may be provided, in the commonly-known manner, at the return position of the chain drivers.

It will be understood that each of the elements described above, or two or more together, may also find a useful application in other types of conveying systems differing from the types described above.

While the invention has been illustrated and described as embodied in conveying systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A conveyor arrangement for conveying magnetizable objects along a predetermined path comprising, in combination an elongated carrier having an elongated carrier face extending in direction of said predetermined path for slidably supporting the objects to be conveyed in longitudinal direction of said elongated carrier; a plurality of permanent magnets disposed adjacent to said elongated carrier face of said elongated carrier spaced from each other and movable in longitudinal direction of said elongated carrier; and driving means for moving said permanent magnets spaced from each other adjacent to and along one side of said carrier face of said elongated carrier so as to provide a magnetic field acting upon said magnetizable objects for sliding the latter on said carrier face of said elongated carrier while said permanent magnets are moved by said driving means adjacent to and along said elongated carrier face of said elongated carrier, said elongated carrier comprising: two ferromagnetic side rails with flanges extending along said path; connecting struts transverse to said path and bridging said side rails, said struts being connected to said side rails for holding said side rails rigidly in secure position; and non-magnetic carrier plate means covering said flanges of said side rails and separating said permanent magnets from said magnetizable objects, said plate means providing a sliding surface for said magnetizable objects along said path.

2. The conveyor arrangement as defined in claim 1 wherein said driving means is a chain drive onto which said permanent magnets are mounted.

3. The conveyor arrangement as defined in claim 2 wherein said chain drive comprises chain wheels and roller chains movable by said chain wheels, said permanent magnet being movably secured to said roller chains.

4. The conveyor arrangement as defined in claim 2 wherein said chain drive comprises a roller chain arranged equally distant from said side rails; and chain wheels for driving said roller chain, said permanent magnets being movably secured to said roller chain.

5. The conveyor arrangement as defined in claim 1 wherein said carrier plates have a ridge directed along said longitudinal direction of said elongated carrier, and disposed at equal distances from said side rails.

6. The conveyor arrangement as defined in claim 5 wherein said carrier plates slope from said ridge to said side rails.

7. The conveyor arrangement as defined in claim 5 wherein said ridge is bulge-shaped and projects from the plane of said carrier.

8. The conveyor arrangement as defined in claim 5 wherein said ridge is gutter-shaped and projecting into said carrier.

9. A conveyor arrangement for conveying magnetizable objects along a predetermined path comprising, in combination, an elongated carrier having an elongated carrier face extending in direction of said predetermined path for slidably supporting the objects to be conveyed in longitudinal direction of said elongated carrier; a plurality of permanent magnets disposed adjacent to said elongated carrier face of said elongated carrier spaced from each other and movable in longitudinal direction of said elongated carrier; driving means for moving said permanent magnets spaced from each other adjacent to and along said carrier face of said elongated carrier so as to provide a magnetic field acting upon said magnetizable objects for sliding the latter on said carrier face of said elongated carrier while said permanent magnets are moved by said driving means adjacent to and along said elongated carrier face of said elongated carrier; and an elongated rectangular ferromagnetic plate with end walls of ferromagnetic material for retaining said permanent magnets, said end walls providing permanent magnetic poles of opposite polarity, said elongated carrier face including a ridge extending into the space between said end walls.

10. A conveyor arrangement for conveying magnetizable objects along a predetermined path comprising, in combination, an elongated carrier having an elongated carrier face extending in direction of said predetermined path for slidably supporting the objects to be conveyed in longitudinal direction of said elongated carrier; a plurality of permanent magnets disposed adjacent to said elongater carrier face of said elongated carrier spaced from each other and movable in longitudinal direction of said elongated carrier; driving means for moving said permanent magnets spaced from each other adjacent to and along said carrier face of said elongated carrier so as to provide a magnetic field acting upon said magnetizable objects for sliding the latter on said carrier face of said elongated carrier while said permanent magnets are moved by said driving means adjacent to and along said elongated carrier face of said elongated carrier; and a ferromagnetic plate associated with each of said permanent magnets for retaining said permanent magnets, said ferromagnetic plate being elongated and having end walls between which at least one permanent magnet is arranged parallel to said walls.

11. The conveyor arrangement as defined in claim 10 wherein several permanent magnets are arranged on said ferromagnetic plate, the adjacent poles of said permanent magnets being of opposite polarity.

12. The conveyor arrangement as defined in claim 10 including a conductive tongue secured to said ferromagnetic plate, two permanent magnets being arranged on said ferromagnetic plate on alternate sides of said conductive tongue such that adjacent poles of said permanent magnets are of the same polarity.

13. The conveyor arrangement as defined in claim 10 wherein said end walls of said ferromagnetic plate are of ferromagnetic material.

14. The conveyor arrangement as defined in claim 10 wherein said end walls of said ferromagnetic plate are of non-ferromagnetic material.

15. The conveyor arrangement as defined in claim 10 including pole shoes associated with each pole of said magnets.

16. The conveyor arrangement as defined in claim 15 wherein said pole shoes are partially recessed on the sides facing each other.

17. A conveyor arrangement for conveying magnetizable objects along a predetermined path comprising, in combination, an elongated carrier having an elongated carrier face extending in direction of said predetermined path for slidably supporting the objects to be conveyed in longitudinal direction of said elongated carrier; a plurality of permanent magnets disposed adjacent to said elongated carrier face of said elongated carrier spaced from each other and movable in longitudinal direction of said elongated carrier; driving means for moving said permanent magnets spaced from each other adjacent to and along said carrier face of said elongated carrier so as to provide a magnetic field acting upon said magnetizable objects for sliding the latter on said carrier face of said elongated carrier while said permanent magnets are moved by said driving means adjacent to and along said elongated carrier face of said elongated carrier; and an elongated rectangular ferromagnetic plate with end walls of ferromagnetic material for retaining said permanent magnets, said end walls providing permanent magnetic poles of opposite polarity.

References Cited

UNITED STATES PATENTS

| | | | |
|---|---|---|---|
| 109,354 | 11/1870 | Smith | 209—226 X |
| 466,515 | 1/1892 | Reed | 209—225 X |
| 2,708,022 | 5/1955 | Pettigrew | 198—41 |
| 2,824,638 | 2/1958 | DeBurgh | 198—41 |
| 3,338,374 | 8/1967 | Dudley | 198—41 |

RICHARD E. AEGERTER, Primary Examiner